United States Patent [19]

Uchida et al.

[11] Patent Number: 5,210,427
[45] Date of Patent: May 11, 1993

[54] PORTABLE ELECTRONIC APPARATUS WITH OPTICAL INTER-MODULE COMMUNICATION

[75] Inventors: Hiroshi Uchida; Susumu Itoh, both of Kanagawa, Japan

[73] Assignee: Sony Corporation, Tokyo, Japan

[21] Appl. No.: 787,037

[22] Filed: Nov. 4, 1991

[30] Foreign Application Priority Data

Nov. 6, 1990 [JP] Japan ................... 2-298983

[51] Int. Cl.⁵ .............................. G02B 27/00
[52] U.S. Cl. ..................... 250/551; 359/154
[58] Field of Search ............. 250/551, 239; 340/600, 340/870.9; 364/713, 708, 709.1; 359/154

[56] References Cited

U.S. PATENT DOCUMENTS

| | | | |
|---|---|---|---|
| 4,348,740 | 9/1982 | White | 359/154 |
| 4,622,681 | 11/1986 | Snell et al. | 250/551 |

FOREIGN PATENT DOCUMENTS

| | | | |
|---|---|---|---|
| 3013705 | 10/1981 | Fed. Rep. of Germany | 359/154 |
| 0222227 | 9/1990 | Japan | 359/154 |
| 0222228 | 9/1990 | Japan | 359/154 |
| 0222231 | 9/1990 | Japan | 359/154 |

*Primary Examiner*—David C. Nelms
*Assistant Examiner*—K. Shami
*Attorney, Agent, or Firm*—Philip M. Shaw, Jr.

[57] ABSTRACT

A portable electronic apparatus including a casing having a connecting surface adapted to be connected to a connecting surface of an external apparatus; a control unit accommodated in the casing; a transmitting terminal provided on the connecting surface of the casing for transmitting data as an optical signal generated by the control unit; and a receiving terminal provided on the connecting surface of the casing for receiving data as an optical signal generated by the external apparatus. The transmitting terminal and the receiving terminal are positioned in symmetrical relationship to each other with respect to a center of the connecting surface of the casing. Accordingly, in carrying out data transfer by optical space communication between two portable electronic apparatuses of the same kind, the transmitting terminal of one of the portable electronic apparatuses can be easily aligned to the receiving terminal of the other portable electronic apparatus.

7 Claims, 2 Drawing Sheets

PORTABLE ELECTRONIC APPARATUS WITH OPTICAL INTER-MODULE COMMUNICATION

BACKGROUND OF THE INVENTION

The present invention relates to a portable electronic apparatus such as a portable computer or a handy terminal adapted to carry out data transfer with an optical signal.

Conventionally, optical communication between two portable electronic apparatuses is carried out by using optical fibers and optical connectors for connecting the two portable electronic apparatuses to each other through the optical fibers. This system is suitable to cope with undue radiation. However, it has a disadvantage such that the optical connectors cannot be quickly connected together. As a technique for solving this problem, it is known to adopt optical space communication without using any optical fibers and optical connectors. In the optical space communication, it is only necessary to decide a direction of radiation of an optical signal, so that data transfer can be easily carried out.

In the optical space communication, however, it is necessary to transmit an optical signal to another apparatus located remote from a transmitting position to some extent. Therefore, an output of the optical signal must be enlarged, resulting in an increase in current consumption. Accordingly, this technique is not applicable to a portable electronic apparatus.

SUMMARY OF THE INVENTION

It is accordingly an object of the present invention to provide a portable electronic apparatus which can carry out data transfer quickly and suppress current consumption.

According to the present invention, there is provided a portable electronic apparatus comprising a casing having a connecting surface for connection to a connecting surface of an external apparatus; a control unit accommodated in said casing; a transmitting terminal provided on said connecting surface of said casing for transmitting data as an optical signal generated by said control unit; and a receiving terminal provided on said connecting surface of said casing for receiving data as an optical signal generated by said external apparatus; wherein said transmitting terminal and said receiving terminal are positioned in symmetrical relationship to each other with respect to a center of said connecting surface of the casing and at its opposite corners and an auxiliary electronic input port is formed between the transmitting and receiving terminals.

In the portable electronic apparatus having the above-mentioned construction, the transmitting terminal and the receiving terminal are positioned in symmetrical relationship the each other with respect to the center of the connecting surface of the portable electronic apparatus. Accordingly, in carrying out data transfer by optical space communication between two portable electronic apparatuses of the same kind having the above construction, for example, the transmitting terminal of one of the portable electronic apparatus can be easily aligned to the receiving terminal of the other portable electronic apparatus only by attaching the connecting surface of the one portable electronic apparatus to the connecting surface of the other portable electronic apparatus in alignment. That is, an optical path between both the portable electronic apparatuses can be easily formed.

As described above, the portable electronic apparatus of the present invention has the transmitting terminal and the receiving terminal positioned in symmetrical relationship to each other with respect to the center of the connecting surface as a reference point. It is therefore advantageous that optical space communication between the portable electronic apparatus of the present invention and an external apparatus, especially, another same type portable electronic apparatus can be carried out easily and securely.

Other objects and features of the invention will be more fully understood from the following detailed description and appended claims when taken with the accompanying drawings.

DETAILED DESCRIPTION OF THE PREFERRED EMBODIMENTS

Figure 1:
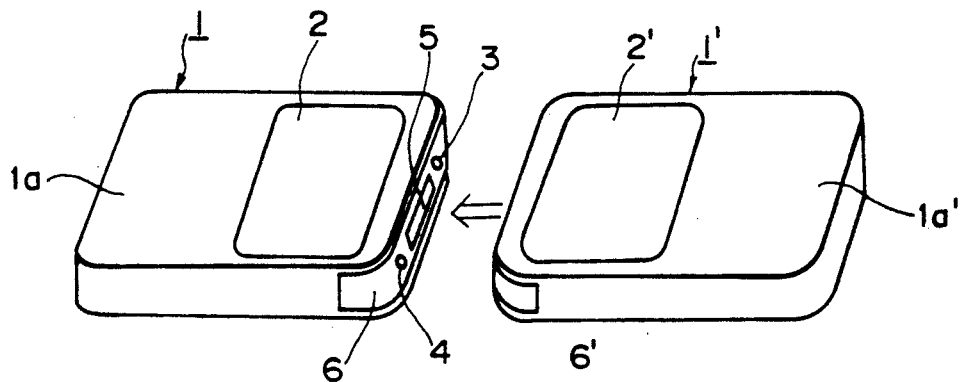
FIG. 1 is a perspective view of a portable computer as a portable electronic apparatus according to a first preferred embodiment of the present invention.

Referring to FIG. 1 which shows a first preferred embodiment of the present invention, reference numeral 1 generally designates a portable computer as the portable electronic apparatus of the present invention, and reference numeral 1' generally designates another portable computer having the same construction as that of the portable computer 1. The portable computer 1' constitutes the external apparatus according to the present invention. Reference number 1a designates a casing of the portable computer 1, and reference numeral 1a' designates a casing of the portable computer 1'. The casings 1a and 1a' are formed in a substantially rectangular shape. An upper surface of the casing 1a is provided with an operating portion 2 for displaying a command or the like and instructing execution of operation. Similarly, an upper surface of the casing 1a' is provided with an operating portion 2' identical with the operating portion 2. One of side surfaces of the casing 1a is provided with an optical signal transmitting terminal 3 and an optical signal receiving terminal 4. The transmitting terminal 3 and the receiving terminal 4 are necessarily spaced apart from each other as far as possible, so as to prevent mutual optical signal interference. To this end, an auxiliary electronic input port in the form of an IC card inserting slot 5 is formed between the transmitting terminal 3 and the receiving terminal 4 on the one side surface of the casing 1a. Accordingly, a space between the transmitting terminal 3 and the receiving terminal 4 can be ensured by a width of the slot 5, thereby preventing the mutual interference. In other words, while it is necessary to space the transmitting terminal 3 and the receiving terminal 4 from each other to some degree, so as to prevent the mutual interference, the space therebetween can be effectively utilized by forming the slot 5 in the space. Further, the slot 5 is arranged at a middle portion of the one side surface of the casing 1a, and the transmitting terminal 3 and the receiving terminal 4 are arranged on opposite side of the slot 5. Accordingly, a positional relation among the transmitting terminal 3, the receiving terminal 4 and the slot 5 can be clearly recognized.

Although not shown in FIG. 1, one of side surfaces of the casing 1a' of the portable computer 1' is also provided with a transmitting terminal, a receiving terminal and a slot which are identical with the transmitting terminal 3, the receiving terminal 4 and the slot 5 of the portable computer 1, respectively, so that the transmitting terminal of the portable computer 1' is adapted to face the receiving terminal 3 of the portable computer 1, and the receiving terminal of the portable computer 1' is adapted to face the transmitting terminal of the portable computer 1.

As to the specific arrangement of the transmitting terminal 3 and the receiving terminal 4, it should be noted that the transmitting terminal 3 and the receiving terminal 4 are arranged in symmetrical relationship to each other with respect to a longitudinal central point on the one side surface of the casing 1a. That is, assuming that a central point on a center line in respect of a longitudinal direction of the one side surface of the casing 1a is defined as a reference point, the transmitting terminal 3 and the receiving terminal 4 are arranged in equally spaced relationship from this reference point, i.e., in symmetrical relationship to this reference point. Further, a transparent cover 6 formed of resin or the like is provided on the one side surface of the casing 1a so as to cover the transmitting terminal 3 and the receiving terminal 4. The slot 5 is formed through the cover 6.

As mentioned above, the transmitting terminal 3, the receiving terminal 4 and the cover 6 constitute an essential part of the present invention, and this essential part is applied to a portable computer in the preferred embodiment shown in FIG. 1. According to the portable computer including this essential part, data is received as an optical signal from the receiving terminal 3, and data collected in the portable computer is transmitted as an optical signal to the outside.

In the preferred embodiment shown in FIG. 1, data transfer is carried out between the portable computers 1 and 1' of the same kind. In operation, the one side surface of the casing 1a of the portable computer 1 on which surface the transmitting terminal 3 and the receiving terminal 4 are provided is attached to the one side surface of the casing 1a' of the portable computer 1'. At this time, by aligning four sides of the one side surface of the casing 1a to four sides of the one side surface of the casing 1a', the reference point on the one side surface of the casing 1a becomes coincident with the reference point on the one side surface of the casing 1a'. Since the transmitting terminal 3 and the receiving terminal 4 on the one side surface of the casing 1a are arranged in symmetrical relationship to each other with respect to the reference point, the transmitting terminal 3 of the portable computer 1 faces the receiving terminal of the portable computer 1', and the receiving terminal 4 of the portable computer 1 faces the transmitting terminal of the portable computer 1'. In this manner, only by attaching the one side surface of the casing 1a of the portable computer 1 to the one side surface of the casing 1a' of the portable computer 1', alignment of optical paths for the data transfer between both the portable computers 1 and 1' can be finished. Thus, the alignment of the optical paths can be easily effected without paying any other special attention.

Figure 2:
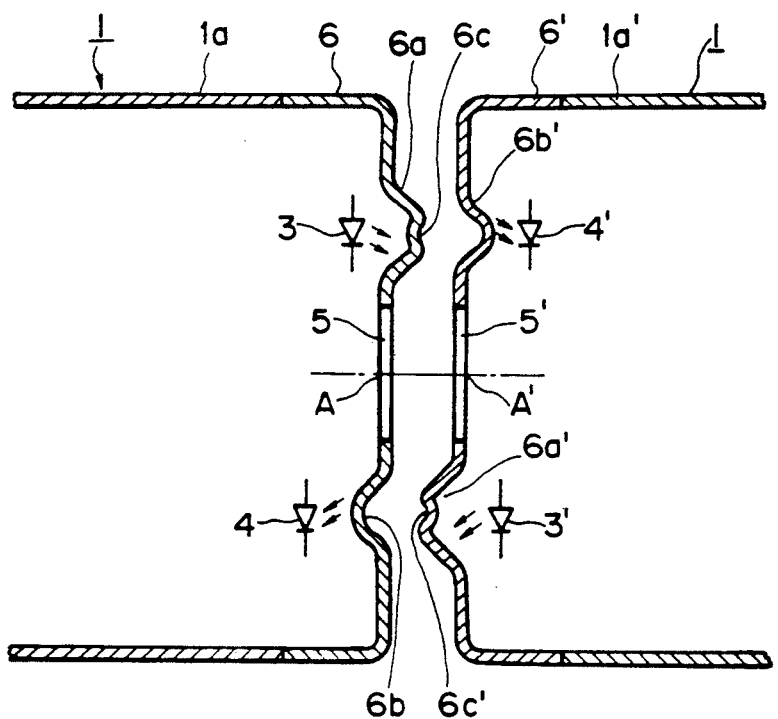
FIG. 2 is a horizontal sectional view of an essential part of a portable computer according to a second preferred embodiment of the present invention.

FIG. 2 shows a second preferred embodiment of the present invention, in which the same reference numerals as those shown in FIG. 1 designates like or corresponding parts. In FIG. 2, the transmitting terminal, the receiving terminal and the slot of the portable computer 1' are designated by reference numerals 3', 4' and 5', respectively. The second preferred embodiment differs from the first preferred embodiment in the point that the covers 6 and 6' are specially designed. That is, the cover 6 of the portable computer 1 is provided with a projection 6a at a portion corresponding to the transmitting terminal 3, and is also provided with a recess 6b at a portion corresponding to the receiving terminal 4. Similarly, the cover 6' of the portable computer 1' is provided with a projections 6a' at a portion corresponding to the transmitting terminal 3', and is also provided with a recess 6b' at a portion corresponding to the receiving terminal 4'. When both the covers 6 and 6' are attached to each other in operation, the projection 6a of the cover 6 comes into engagement with the recess 6b' of the cover 6', and the recess 6b of the cover 6 comes into engagement with the projection 6a' of the cover 6'. Therefore, the alignment of the optical paths can be effected more easily as compared with the first preferred embodiment shown in FIG. 1. Thus, the covers 6 and 6' also serve as guides. When the projections 6a and 6a' comes into engagement with the recesses 6b and 6b', respectively, reference points A and A' on the covers 6 and 6' are aligned to each other so as to lie on a one-dot chain line (a longitudinal center line of each portable computer). Accordingly, light emitted from the transmitting terminal 3 of the portable computer 1 is transmitted through the projection 6a of the cover 6 and the recess 6b' of the cover 6' to the receiving terminal 4' of the portable computer 1'.

In engaging the projections 6a and 6a' with the recesses 6b and 6b', respectively, there is a possibility of flaw due to rubbing between the projections 6a and 6a' and the recesses 6b and 6b', causing easy occurrence of light scattering. To cope with this, the projection 6a is formed at its top with a recess 6c in the range of light transmission. Similarly, the projection 6a' is formed at its top with a recess 6c' in the range of light transmission. With this structure, the rubbing between the projections 6a and 6a' and the recesses 6b and 6b' can be suppressed to reduce the flaw.

According to the first and second preferred embodiments as described above, only by attaching the one side surface of the casing 1a of the portable computer 1 to the one side surface of the casing 1a' of the portable computer 1', the transmitting terminal 3 and the receiving terminal 4 of the portable computer 1 can be closely aligned to the receiving terminal 4' and the transmitting terminal 3' of the portable computer 1', respectively, so that electrically non-contact optical space communication between both the portable computers 1 and 1' is effected. Accordingly, it is unnecessary to provide a connecting cable or a connector for data transfer. Further, when both the portable computers 1 and 1' are attached to each other in operation, the transmitting terminal 3 and the receiving terminal 4 of the portable computer 1 are disposed close to the receiving terminal 4' and the transmitting terminal 3' of the portable computer 1', respectively. Accordingly, an output of the transmitting terminals 3 and 3' can be made smaller than that in the conventional optical space communication.

As a result, current consumption can be greatly suppressed to thereby reduce battery consumption, so that the optical space communication in the preferred embodiments is greatly effective as a method for data transfer between two portable electronic apparatuses of the same kind.

Furthermore, as the transmitting terminal 3 and the receiving terminal 4 of the portable computer 1 are disposed close to the receiving terminal 4' and the transmitting terminal 3' of the portable computer 1' in operation, an external noise is hardly mixed in. In addition, a sufficient receiving level can be ensured even though an output of an optical signal is low. Accordingly, in carrying out the data transfer by the optical space communication, no complex error correction is needed, and malfunction due to the external noise is hard to occur.

Figure 3:
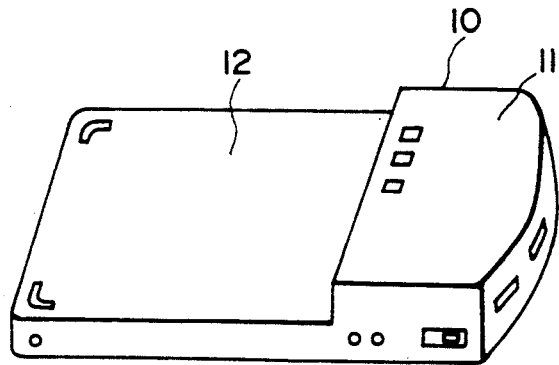
FIG. 3 is a perspective view of a peripheral apparatus to which the portable electronic apparatus of the present invention is to be connected, according to a third preferred embodiment of the present invention.

FIG. 3 shows a third preferred embodiment of the present invention, in which data collected in the portable computer 1 is transferred to a peripheral apparatus 10 such as a printer. The peripheral apparatus 10 is provided with a connecting portion 11 for connecting the portable computer 1 and a mounting portion 12 for mounting the portable computer 1. the connecting portion 11 is provided with a transmitting terminal and a receiving terminal having the same function as that of the transmitting terminal 3 and the receiving terminal 4 of the portable computer 1. The connecting portion 11 is further provided with a recess adapted to engage the projection 6a of the portable computer 1 and a projection adapted to engage the recess 6b of the portable computer 1. With this structure, the portable computer 1 and the peripheral apparatus 10 can be easily connected together, and the data in the portable computer 1 can be securely transferred to the peripheral apparatus 10.

Figure 4:
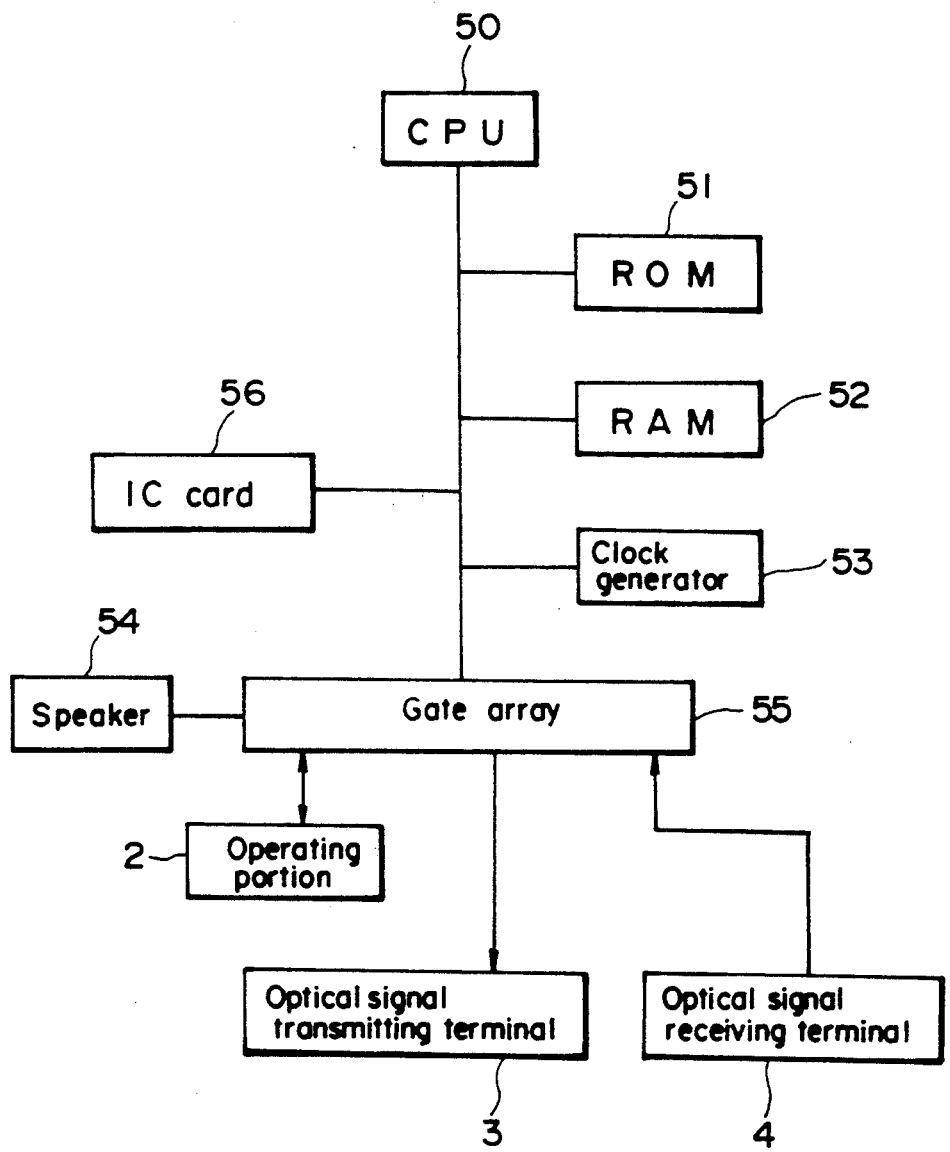
FIG. 4 is a block diagram of an electrical construction of the portable electronic apparatus of the present invention.

FIG. 4 shows an electrical construction of the portable computer 1 in a schematic block diagram form. As shown in FIG. 4, the portable computer 1 includes a control unit comprising a CPU 50 for generally controlling the operation, a ROM 51 previously storing a predetermined program, a RAM 52 for temporarily storing data, a clock generator 53 for generating an operation timing signal, and a gate array 55 for controlling the operating portion 2, the transmitting terminal 3 and the receiving terminal 4. The gate array 55 also controls a speaker 54 to output a predetermined sound signal thereto. Reference numeral 56 denotes an IC card to be inserted from the slot 5.

In the above construction, the program stored in the ROM 51 is executed by the CPU 50 with a period of clock generated by the clock generator 53. Data received from the receiving terminal 4 is temporarily stored into the RAM 52, and if required, the data is stored into the IC card 56. A predetermined command is input by operating the operating portion 2, as required, and it is displayed on the operating portion. Further, a sound is generated from the speaker 54, if required. A transmitting timing of an optical signal from the transmitting terminal 3 and a receiving timing of an optical signal from the receiving terminal 4 are decided by the gate array 55.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A portable electronic apparatus comprising:
   a rectangularly shaped casing having a connecting surface formed on one exterior side of the casing for connecting to a connecting surface of an external apparatus, the connecting surface having a longitudinal center;
   a control unit accommodated in the casing;
   a transmitting terminal provided on the connecting surface of the casing at a first corner of the casing for transmitting data as an optical signal generated by the control unit; and
   a receiving terminal provided on the connecting surface of the casing at a second corner for receiving data as an optical signal generated by the external apparatus;
   wherein the transmitting terminal and the receiving terminal are positioned in symmetrical relationship to each other with respect to the longitudinal center of the connecting surface of the casing; and
   further including an auxiliary electronic input port formed between the transmitting and receiving terminals.

2. A portable electronic apparatus according to claim 1, wherein the optical signal is emitted from the transmitting terminal directly through the connecting surface of the casing.

3. A portable electronic apparatus comprising:
   a casing having a connecting surface for connecting to a connecting surface of an external apparatus;
   a control unit accommodated in the casing;
   a transmitting terminal provided on the connecting surface of the casing for transmitting data as an optical signal generated by the control unit;
   a receiving terminal provided on the connecting surface of the casing for receiving data as an optical signal generated by the external apparatus;
   wherein the transmitting terminal and the receiving terminal are positioned in symmetrical relationship to each other with respect to a center of the connecting surface of the casing; and
   wherein the connecting surface of the casing has a memory card inserting slot extending between the transmitting terminal and the receiving terminal.

4. A portable electronic apparatus according to claim 1, wherein the external apparatus has the same construction as that of the electronic apparatus, whereby in transmitting the data from the electronic apparatus to the external apparatus, the connecting surface of the electronic apparatus is attached to the connecting surface of the external apparatus so that the transmitting terminal of the electronic apparatus faces a receiving terminal of the external apparatus, and the receiving terminal of the electronic apparatus faces a transmitting terminal of the external apparatus.

5. A portable electronic apparatus according to claim 1, wherein the external apparatus is a peripheral apparatus having a connecting surface to be connected with the connecting surface of the electronic apparatus, whereby in transmitting the data from the electronic apparatus to the peripheral apparatus, the connecting surface of the electronic apparatus is attached to the connecting surface of the peripheral apparatus so that the transmitting terminal of the electronic apparatus faces a receiving terminal of the peripheral apparatus, and the receiving terminal of the electronic apparatus faces a transmitting terminal of the peripheral apparatus.

6. A portable electronic device according to claims 4 or 5, wherein the connecting surfaces each have a projection at a position corresponding to one of the transmitting terminal or the receiving terminal, and a recess at a portion corresponding to the other of the transmitting terminal or the receiving terminal.

7. A portable electronic device according to claim 6 wherein the projection is formed with a recess at its top in the range of light transmission.

* * * * *